(12) United States Patent
Nakao et al.

(10) Patent No.: US 10,797,528 B2
(45) Date of Patent: Oct. 6, 2020

(54) NON-CONTACT FEEDING DEVICE

(71) Applicant: Omron Corporation, Kyoto (JP)

(72) Inventors: Goro Nakao, Kyoto (JP); Yusuke Kawai, Kyoto (JP); Atsushi Nomura, Kyoto (JP); Toshiyuki Zaitsu, Kyoto (JP)

(73) Assignee: Omron Corporation, Kyoto (JP)

( * ) Notice: Subject to any disclaimer, the term of this patent is extended or adjusted under 35 U.S.C. 154(b) by 22 days.

(21) Appl. No.: 16/282,134

(22) Filed: Feb. 21, 2019

(65) Prior Publication Data

US 2019/0305600 A1    Oct. 3, 2019

(30) Foreign Application Priority Data

Mar. 27, 2018   (JP) ................. 2018-060060

(51) Int. Cl.
    *H02J 50/80*    (2016.01)
    *H02J 50/12*    (2016.01)
    *H02J 50/40*    (2016.01)

(52) U.S. Cl.
    CPC .............. *H02J 50/12* (2016.02); *H02J 50/40* (2016.02); *H02J 50/80* (2016.02)

(58) Field of Classification Search
    CPC ............. H02J 50/12; H02J 50/80; H02J 50/40
    See application file for complete search history.

(56) References Cited

U.S. PATENT DOCUMENTS

| 10,158,255 | B2 * | 12/2018 | Stevens | H02J 7/00302 |
| 2004/0021427 | A1 * | 2/2004 | Bruwer | H02J 7/0063 |
| | | | | 315/200 A |
| 2009/0174263 | A1 * | 7/2009 | Baarman | H02J 50/12 |
| | | | | 307/104 |

(Continued)

FOREIGN PATENT DOCUMENTS

| EP | 3151381 A1 | 4/2017 |
| JP | 2012-139033 A | 7/2012 |

(Continued)

OTHER PUBLICATIONS

Office Action in counterpart European Patent Application No. 19 156 958.1 dated Feb. 7, 2020 (8 pages).

(Continued)

*Primary Examiner* — Pinping Sun
(74) *Attorney, Agent, or Firm* — Osha Liang LLP

(57) ABSTRACT

A non-contact feeding device has a power transmission device, and a power receiving device to which power is transmitted from the power transmission device in a non-contact manner. The power transmission device includes a transmission coil configured to supply the power to the power receiving device, a power supply circuit configured to supply AC power to the transmission coil and to be capable of adjusting at least one of a switching frequency and voltage of the AC power supplied to the transmission coil, a first communicator configured to receive an output voltage abnormal signal from the power receiving device, and a control circuit configured to change at least one of the (Continued)

switching frequency and the voltage of the AC power supplied from the power supply circuit to the transmission coil when the first communicator receives the output voltage abnormal signal.

4 Claims, 6 Drawing Sheets

(56) References Cited

U.S. PATENT DOCUMENTS

| | | | |
|---|---|---|---|
| 2012/0068548 A1* | 3/2012 | Endo | H02J 50/12 |
| | | | 307/104 |
| 2012/0313448 A1* | 12/2012 | Anttila | H02J 50/12 |
| | | | 307/104 |
| 2013/0015813 A1* | 1/2013 | Kim | H02J 50/12 |
| | | | 320/108 |
| 2013/0049484 A1 | 2/2013 | Weissentern et al. | |
| 2015/0207333 A1* | 7/2015 | Baarman | H02J 50/60 |
| | | | 307/104 |
| 2016/0079951 A1* | 3/2016 | Oosumi | H02J 50/10 |
| | | | 307/104 |
| 2016/0336816 A1* | 11/2016 | Mach | H02J 50/10 |
| 2017/0005525 A1* | 1/2017 | Lecias, Jr. | H02M 7/06 |
| 2017/0098965 A1* | 4/2017 | Kikuchi | H02J 50/10 |
| 2018/0198287 A1* | 7/2018 | Takikawa | H02J 5/005 |

FOREIGN PATENT DOCUMENTS

| | | |
|---|---|---|
| JP | 2014-140303 A | 7/2014 |
| JP | 2015-065724 A | 4/2015 |
| JP | 2015065724 A * | 4/2015 |

OTHER PUBLICATIONS

Extended European Search Report in counterpart European Application No. 19156958.1 dated May 17, 2019 (8 pages).

* cited by examiner

NON-CONTACT FEEDING DEVICE

CROSS-REFERENCE TO RELATED APPLICATION

This application is based on Japanese Patent Application No. 2018-060060 filed with the Japan Patent Office on Mar. 27, 2018, the entire contents of which are incorporated herein by reference.

BACKGROUND

Field

The present invention relates to a non-contact feeding device.

Related Art

Conventionally, what is called a non-contact feeding (also referred to as wireless feeding) technique of transmitting power through a space with no use of a metallic contact or the like has been studied.

In a feeding device in which the non-contact feeding technique is used (hereinafter simply referred to as a non-contact feeding device), a degree of coupling between a coil on a primary side (power transmission side) and a coil on a secondary side (power receiving side) changes when a positional relationship between the two coils fluctuates. As a result, voltage output from a device on the power receiving side to a load circuit also fluctuates. In some cases, the voltage output to the load circuit increases excessively, which results in a possibility of generating a breakdown of the device on the power receiving side or the load circuit. For example, Japanese Unexamined Patent Application Publication Nos. 2015-65724 and 2012-139033 propose a technique of suppressing the excessive increase in output voltage.

For example, in a technique proposed by Japanese Unexamined Patent Application Publication No. 2015-65724, a resonance operation is suppressed by the method in which a resonance suppressing circuit including a control coil magnetically coupled to a power receiving resonance coil is provided on the power receiving side to monitor the output voltage and the control coil is short-circuited or open by a switch. Japanese Unexamined Patent Application Publication No. 2012-139033 proposes a power receiving device including a power receiving antenna and a rectifier circuit of a non-contact power transmission system. In the power receiving device, a power receiving coil, a resonance coil electromagnetically coupled to the power receiving coil, an adjustment coil electromagnetically coupled to the resonance coil, and a unit that switches impedance of the adjustment coil are provided in the power receiving antenna.

SUMMARY

However, in the techniques disclosed in Japanese Unexamined Patent Application Publication Nos. 2015-65724 and 2012-139033, the suppression of the resonance between the coil on the power transmission side and the coil on the power receiving side due to the increase of the output voltage and a release of the suppression of the resonance due to the decrease of the output voltage are repeated unless the degree of coupling between the coil on the power transmission side and the coil on the power receiving side change. In spite of intermittent generation of a period during which the power is not transmitted, the device on the power transmission side continues the power transmission operation. A power factor decreases by short-circuiting the coil that is electromagnetically coupled to the coil on the power receiving side. As a result, power transmission efficiency decreases and an energy loss associated with power transmission increases.

One or more embodiments of the present invention provides a non-contact feeding device capable of suppressing the energy loss while suppressing the excessive increase of the voltage output from the device on the power receiving side.

According to one aspect of the present invention, a non-contact feeding device includes: a power transmission device; and a power receiving device to which power is transmitted from the power transmission device in a non-contact manner. In this non-contact feeding device, the power transmission device includes: a transmission coil configured to supply the power to the power receiving device; a power supply circuit configured to supply AC power to the transmission coil and to be capable of adjusting at least one of a switching frequency and voltage of the AC power supplied to the transmission coil; a first communicator configured to receive an output voltage abnormal signal from the power receiving device; and a control circuit configured to change at least one of the switching frequency and the voltage of the AC power supplied from the power supply circuit to the transmission coil when the first communicator receives the output voltage abnormal signal. The power receiving device includes: a resonance circuit including a receiving coil receiving the power from the power transmission device and a resonance capacitor connected in series to the receiving coil; a rectifier circuit configured to rectify the power received through the resonance circuit; a resonance suppressing coil disposed so as to be capable of being electromagnetically coupled to the receiving coil; a switch circuit connected to the resonance suppressing coil to be capable of switching between short circuit and opening of the resonance suppressing coil; a voltage detection circuit configured to measure an output voltage of the power output from the rectifier circuit to obtain a measured value of the output voltage; a second communicator capable of communicating with the first communicator; and a determination circuit configured to cause the second communicator to transmit the output voltage abnormal signal while controlling the switch circuit so as to short-circuit the resonance suppressing coil when the measured value of the output voltage becomes greater than or equal to a predetermined upper-limit threshold.

With this configuration of the non-contact feeding device according to one or more embodiments of the present invention, the energy loss can be suppressed while the excessive increase of the voltage output from the device on the power receiving side is suppressed.

In the non-contact feeding device, the determination circuit of the power receiving device controls the switch circuit so as to open the resonance suppressing coil when the control circuit of the power transmission device starts the change of at least one of the switching frequency and the voltage of the AC power.

Consequently, the non-contact feeding device can search the switching frequency and the voltage at which the transmission coil can efficiently transmit the power while preventing breakdown of the power receiving device or the load circuit connected to the power receiving device due to the excessive increase of the output voltage.

In the non-contact feeding device, when the first communicator receives the output voltage abnormal signal, preferably the control circuit of the power transmission device controls the switching frequency of the AC power supplied from the power supply circuit to the transmission coil such that the measured value of the output voltage does not change even when a resistance of a load circuit connected to the rectifier circuit of the power receiving device changes.

Consequently, even when the output voltage increases once, the non-contact feeding device can resume the constant voltage output operation by controlling the switching frequency.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. In a non-contact feeding device according to one or more embodiments of the present invention, a device on a power receiving side includes a receiving coil for power receiving and a resonance suppressing coil (hereinafter simply referred to as a resonance suppressing coil) that is provided so as to be capable of being electromagnetically coupled to the receiving coil. When the voltage output from the device on the power receiving side becomes greater than or equal to a predetermined threshold, the device on the power receiving side short-circuits the resonance suppressing coil to change a resonance condition of a resonance circuit including the receiving coil, and notifies a device on a power transmission side that the output voltage becomes greater than or equal to the predetermined threshold. Upon receiving the notification, the device on the power transmission side controls a frequency and voltage of AC power applied to the transmission coil on the power transmission side to adjust the voltage output from the device on the power receiving side to a predetermined voltage. That is, the non-contact feeding device controls the frequency and voltage of the AC power applied to the transmission coil on the power transmission side so as to maintain constant voltage output operation. The device on the power receiving side maintains a short circuit state of the resonance suppressing coil until the frequency and voltage of the AC power applied to the transmission coil are started. Consequently, the non-contact feeding device suppresses an excessive increase of the voltage output from the device on the power receiving side, and enables continuous power transmission to suppress an energy loss.

Figure 1:
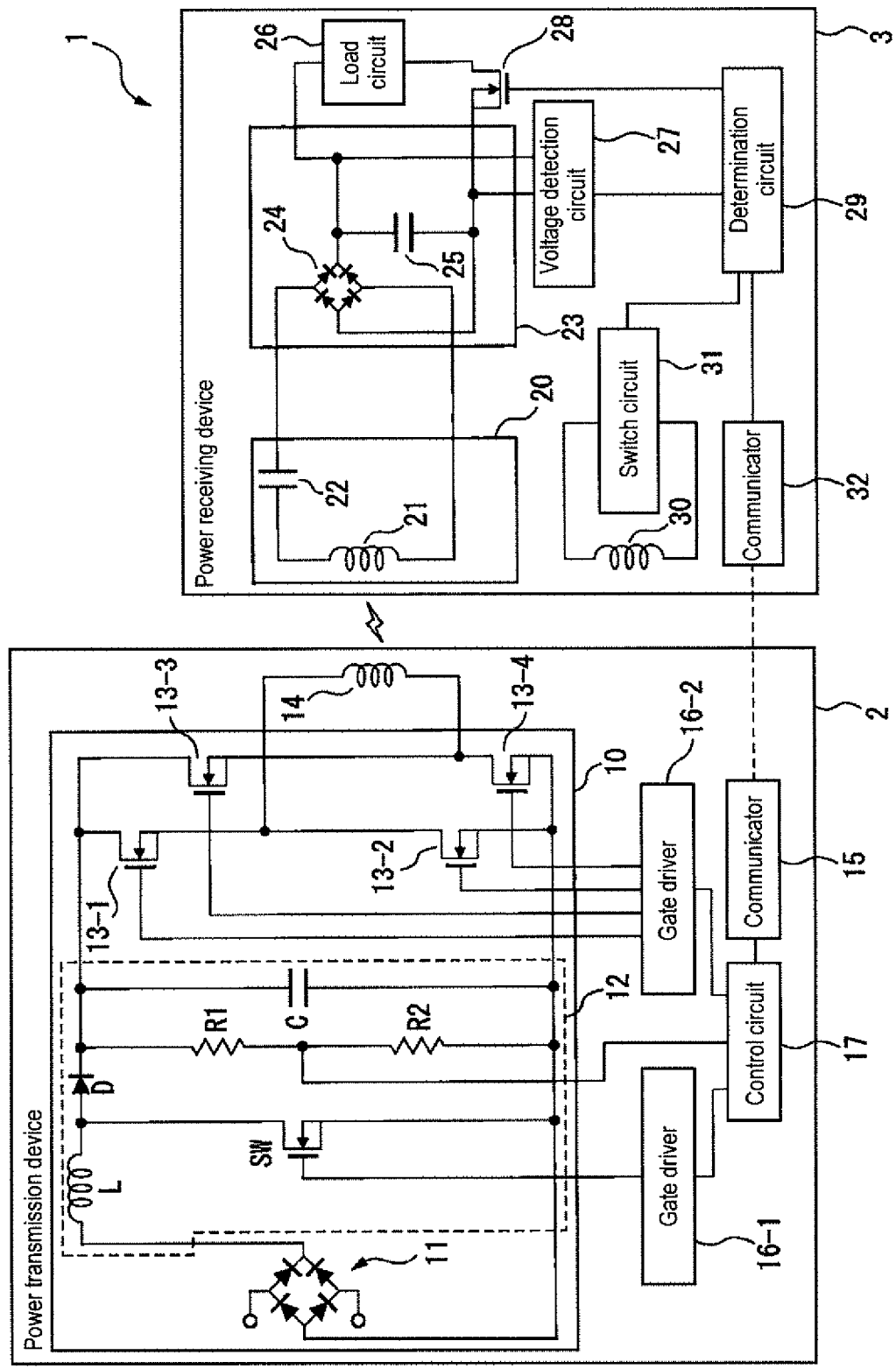
FIG. 1 is a schematic configuration diagram illustrating a non-contact feeding device according to one or more embodiments of the present invention.

FIG. 1 is a schematic configuration diagram illustrating the non-contact feeding device of one or more embodiments of the present invention. As illustrated in FIG. 1, a non-contact feeding device 1 includes a power transmission device 2 and a power receiving device 3 that performs power transmission in a non-contact manner through a space from the power transmission device 2. The power transmission device 2 includes a power supply circuit 10, a transmission coil 14, a communicator 15, gate drivers 16-1 and 16-2, and a control circuit 17. On the other hand, the power receiving device 3 includes a resonance circuit 20 including a receiving coil 21 and a resonance capacitor 22, a rectification smoothing circuit 23, a load circuit 26, a voltage detection circuit 27, a switching element 28, a determination circuit 29, a resonance suppressing coil 30, a switch circuit 31, and a communicator 32. Although the non-contact feeding device 1 does not use resonance on the power transmission side, the non-contact feeding device 1 has the same configuration as what is called series and series capacitors system (hereinafter referred to as the SS system), so that the non-contact feeding device 1 can perform the constant voltage output operation.

The power transmission device 2 will be described.

The power supply circuit 10 supplies AC power having an adjustable switching frequency and an adjustable voltage to the transmission coil 14. For this purpose, the power supply circuit 10 includes a power source 11, a power factor improvement circuit 12, and four switching elements 13-1 to 13-4.

The power source 11 supplies electric power having a predetermined pulsating voltage. For this purpose, the power source 11 is connected to a commercial AC power source, and includes a full-wave rectifier circuit that rectifies the AC power supplied from the commercial AC power source.

The power factor improvement circuit 12 converts the voltage of the power output from the power source 11 into the voltage according to the control from the control circuit 17, and outputs the voltage. For this purpose, for example, the power factor improvement circuit 12 includes a coil L and a diode D that are connected in series in order from a positive-side terminal of the power source 11, a switching element SW that is an n-channel type metal-oxide semiconductor field-effect transistor (MOSFET) in which a drain terminal is connected between the coil L and the diode D and a source terminal is connected to a negative-side terminal of the power source 11, and a smoothing capacitor C that is connected in parallel to the switching element SW with the diode D interposed therebetween. A gate terminal of the switching element SW is connected to the gate driver 16-1. The power factor improvement circuit 12 also includes two resistors R1, R2 connected in series between the positive-side terminal and the negative-side terminal of the power source 11. The resistors R1, R2 are connected in parallel to the smoothing capacitor C between the diode D and the smoothing capacitor C. The voltage between the resistors R1, R2 is measured by the control circuit 17 as the voltage indicating the voltage output from the diode D.

According to a duty ratio instructed by the control circuit 17, the gate driver 16-1 controls turn-on and turn-off of the switching element SW such that a trajectory of a current waveform output from the diode D is matched with a trajectory of the voltage supplied from the power source 11, whereby the power factor improvement circuit 12 performs power factor improving operation. The voltage output from the diode D increases with increasing duty ratio at which the switching element SW is turned on.

The voltage output from the diode D is smoothed by the smoothing capacitor C, and supplied to the transmission coil 14 through the four switching elements 13-1 to 13-4.

The power factor improvement circuit 12 is not limited to the above configuration, but may have another configuration capable of adjusting the output voltage under the control of the control circuit 17.

For example, an n-channel type MOSFET can be used as the four switching elements 13-1 to 13-4. Among the four switching elements 13-1 to 13-4, the switching elements 13-1 and 13-2 are connected in series between the positive-side terminal and the negative-side terminal of the power source 11 through the power factor improvement circuit 12. In one or more embodiments, the switching element 13-1 is connected to the positive side of the power source 11, and the switching element 13-2 is connected to the negative side of the power source 11. The drain terminal of the switching element 13-1 is connected to the positive-side terminal of the power source 11 through the power factor improvement circuit 12, and the source terminal of the switching element 13-1 is connected to the drain terminal of the switching element 13-2. The source terminal of the switching element 13-2 is connected to the negative-side terminal of the power source 11 through the power factor improvement circuit 12. The source terminal of the switching element 13-1 and the drain terminal of the switching element 13-2 are connected to one end of the transmission coil 14, and the source terminal of the switching element 13-2 is connected to the other end of the transmission coil 14 through the switching element 13-4.

Similarly, among the four switching elements 13-1 to 13-4, the switching elements 13-3 and 13-4 are connected in parallel to the switching elements 13-1 and 13-2, and connected in series between the positive-side terminal and the negative-side terminal of the power source 11 through the power factor improvement circuit 12. The switching element 13-3 is connected to the positive side of the power source 11, and the switching element 13-4 is connected to the negative side of the power source 11. The drain terminal of the switching element 13-3 is connected to the positive-side terminal of the power source 11 through the power factor improvement circuit 12, and the source terminal of the switching element 13-3 is connected to the drain terminal of the switching element 13-4. The source terminal of the switching element 13-4 is connected to the negative-side terminal of the power source 11 through the power factor improvement circuit 12. The source terminal of the switching element 13-3 and the drain terminal of the switching element 13-4 are connected to the other end of the transmission coil 14.

The gate terminals of the switching elements 13-1 to 13-4 are connected to the control circuit 17 through the gate driver 16-2. In order to ensure that the switching elements 13-1 to 13-4 are turned on when the turn-on voltage is applied to the gate terminals of the switching elements 13-1 to 13-4, the gate terminal of each of the switching elements 13-1 to 13-4 may be connected to the source terminal of each of the switching elements 13-1 to 13-4 through the resistor. Each of the switching elements 13-1 to 13-4 switches between the turn-on and the turn-off at an adjustable switching frequency according to a control signal from the control circuit 17. In one or more embodiments, a pair of the switching elements 13-1 and 13-4 and a pair of the switching elements 13-2 and 13-3 switch alternately between the turn-on and the turn-off such that the switching elements 13-2 and 13-3 are turned off while the switching elements 13-1 and 13-4 are turned on, and such that the switching elements 13-1 and 13-4 are turned off while the switching elements 13-2 and 13-3 are turned on. As a result, DC power supplied from the power source 11 through the power factor improvement circuit 12 is converted into AC power having the switching frequency of each switching element, and supplied to the transmission coil 14.

The transmission coil 14 transmits the AC power supplied from the power supply circuit 10 to the resonance circuit 20 of the power receiving device 3 through a space.

Each time the communicator 15 receives a radio signal from the communicator 32 of the power receiving device 3, the communicator 15 extracts abnormal voltage generation information indicating the excessive increase of the voltage output from the rectification smoothing circuit 23 of the power receiving device 3 or determination information indicating whether the non-contact feeding device 1 performs the constant voltage output operation from the radio signal, and outputs the abnormal voltage generation information or the determination information to the control circuit 17. For this reason, for example, the communicator 15 includes an antenna that receives the radio signal pursuant to a predetermined radio communication standard and a communication circuit that demodulates the radio signal. Examples of the predetermined radio communication standard include ISO/IEC 15693, ZigBee (registered trademark), and Bluetooth (registered trademark).

The gate driver 16-1 receives the control signal switching between the turn-on and the turn-off of the switching element SW of the power factor improvement circuit 12 from the control circuit 17, and changes the voltage applied to the gate terminal of the switching element SW according to the control signal. That is, upon receiving the control signal turning on the switching element SW, the gate driver 16-1 applies a relatively high voltage to the gate terminal of the switching element SW such that the switching element SW is turned on. On the other hand, upon receiving the control signal turning off the switching element SW, the gate driver 16-1 applies a relatively low voltage to the gate terminal of the switching element SW such that the switching element SW is turned off. Consequently, the gate driver 16-1 switches between the turn-on and the turn-off of the switching element SW of the power factor improvement circuit 12 in timing instructed by the control circuit 17.

The gate driver 16-2 receives the control signal switching between the turn-on and the turn-off of each of the switching elements 13-1 to 13-4 from the control circuit 17, and changes the voltage applied to the gate terminal of each of the switching elements 13-1 to 13-4 according to the control signal. That is, upon receiving the control signal turning on the switching elements 13-1 and 13-4, the gate driver 16-2 applies a relatively high voltage to the gate terminals of the switching elements 13-1 and 13-4 such that the switching elements 13-1 and 13-4 are turned on. Consequently, the current from the power source 11 is passed through the switching element 13-1, the transmission coil 14, and the switching element 13-4. On the other hand, upon receiving the control signal turning off the switching elements 13-1 and 13-4, the gate driver 16-2 applies a relatively low voltage to the gate terminals of the switching elements 13-1 and 13-4 such that the switching elements 13-1 and 13-4 are turned off, and such that the current from the power source 11 is not passed through the switching elements 13-1 and 13-4. The gate driver 16-2 also controls the voltage applied to the gate terminal of each of the switching elements 13-2 and 13-3. Thus, when the switching elements 13-1 and 13-4 are turned off and when the switching elements 13-2 and 13-3 are turned on, the current from the power source 11 is passed through the switching element 13-3, the transmission coil 14, and the switching element 13-2.

For example, the control circuit 17 includes a nonvolatile memory circuit and a volatile memory circuit, an arithmetic circuit, and an interface circuit that connects the control circuit 17 to another circuit. Upon receiving the abnormal voltage generation information from the communicator 15, the control circuit 17 starts the control of the switching frequency and the voltage of the AC power supplied from the power supply circuit 10 to the transmission coil 14. Subsequently, each time the control circuit 17 receives the determination information from the communicator 15, the control circuit 17 controls the switching frequency and the voltage of the AC power supplied from the power supply circuit 10 to the transmission coil 14 according to the determination information.

For this reason, in one or more embodiments, the control circuit 17 controls the switching elements 13-1 to 13-4 such that the pair of the switching elements 13-1 and 13-4 and the pair of the switching elements 13-2 and 13-3 are alternately turned on, and such that a period during which the pair of the switching elements 13-1 and 13-4 is turned on is equal to a period during which the pair of the switching elements 13-2 and 13-3 is turned on in one cycle corresponding to the switching frequency. In order to prevent the pair of the switching elements 13-1 and 13-4 and the pair of the switching elements 13-2 and 13-3 from being simultaneously turned on to short-circuit the power source 11, a dead time when both the pair of the switching elements 13-1 and 13-4 and the pair of the switching elements 13-2 and 13-3 are turned off may be provided in the control circuit 17 when the pair of the switching elements 13-1 and 13-4 and the pair of the switching elements 13-2 and 13-3 switch between the turn-on and the turn-off.

The control circuit 17 selects a duty ratio according to the switching frequency by referring to a reference table representing a relationship between the switching frequency and the duty ratio of the turn-on and turn-off control of the switching element SW of the power factor improvement circuit 12, the duty ratio corresponding to the voltage applied to the transmission coil 14 at which the constant voltage output is obtained at the switching frequency. The control circuit 17 decides timing of switching between the turn-on and the turn-off of the switching element SW according to the duty ratio and the change in voltage output from the diode D of the power factor improvement circuit 12, and outputs the control signal indicating the timing to the gate driver 16-1.

In the case that the communicator 15 cannot receive the radio signal from the power receiving device 3, it is assumed that the power receiving device 3 does not exist at a position where the power receiving device 3 can receive the power supply from the power transmission device 2, namely, it is assumed that the power transmission device 2 is in a standby state. In this case, the control circuit 17 may set the duty ratio of the turn-on and turn-off control of the switching element SW to a minimum settable value. Consequently, the voltage applied to the transmission coil 14 also becomes the minimum settable value while the power transmission device 2 is in the standby state, so that an energy loss is suppressed.

Details of the control of the switching frequency and the voltage applied to the transmission coil 14 using the control circuit 17 will be described later.

The power receiving device 3 will be described below.

The resonance circuit 20 is an LC resonance circuit including the receiving coil 21 and the resonance capacitor 22, which are connected in series to each other. One end of the receiving coil 21 of the resonance circuit 20 is connected to one of input terminals of the rectification smoothing circuit 23 through the resonance capacitor 22. The other end of the receiving coil 21 is connected to the other input terminal of the rectification smoothing circuit 23.

The receiving coil 21 and the resonance capacitor 22 resonate with alternating current passed through the transmission coil 14 of the power transmission device 2, thereby receiving the power from the transmission coil 14. The receiving coil 21 outputs the received power to the rectification smoothing circuit 23 through the resonance capacitor 22. A number of turns of the receiving coil 21 and a number of turns of the transmission coil 14 of the power transmission device 2 may be equal to or different from each other.

The resonance capacitor 22 is connected in series to the receiving coil 21. That is, one end of the resonance capacitor 22 is connected to one end of the receiving coil 21, and the other end of the resonance capacitor 22 is connected to the rectification smoothing circuit 23. The resonance capacitor 22 outputs the power received by resonance with the receiving coil 21 to the rectification smoothing circuit 23.

The rectification smoothing circuit 23 is an example of the rectifier circuit, includes a full-wave rectifier circuit 24 including four bridge-connected diodes and a smoothing capacitor 25, rectifies and smoothes the power received from the resonance circuit 20, and converts the power into DC power. The rectification smoothing circuit 23 outputs the DC power to the load circuit 26.

The voltage detection circuit 27 measures the output voltage between both the terminals of the rectification smoothing circuit 23 at each predetermined cycle. Because the output voltage between both the terminals of the rectification smoothing circuit 23 corresponds to the output voltage of the resonance circuit 20 in a one-to-one manner, a measured value of the output voltage between both the terminals of the rectification smoothing circuit 23 indirectly becomes a measured value of the output voltage of the resonance circuit 20. For example, any one of various publicly known voltage detection circuits capable of detecting a DC voltage can be used as the voltage detection circuit 27. The voltage detection circuit 27 outputs a voltage detection signal indicating the measured value of the output voltage to the determination circuit 29.

For example, the switching element 28 is a MOSFET, and is connected between the rectification smoothing circuit 23 and the load circuit 26. The current is not passed from the rectification smoothing circuit 23 to the load circuit 26 when the switching element 28 is turned off. On the other hand, the current is passed from the rectification smoothing circuit 23 to the load circuit 26 when the switching element 28 is turned on.

The determination circuit 29 determines whether the measured value of the output voltage received from the voltage detection circuit 27 is greater than or equal to a predetermined upper-limit threshold. When the measured value is greater than or equal to the upper-limit threshold, the switch circuit 31 is controlled so as to short-circuit the resonance suppressing coil 30, and the communicator 32 is notified that the measured value of the output voltage is greater than or equal to the upper-limit threshold, namely, that the output voltage increases excessively. Consequently, when the measured value of the output voltage reaches the upper-limit threshold, the determination circuit 29 immediately changes the resonance frequency of the resonance circuit 20 to decrease the power transmitted between the power transmission device 2 and the power receiving device 3, and resultantly the voltage output from the resonance circuit 20 can be decreased. The upper-limit threshold can be set to an upper limit of the voltage at which the load circuit 26 and the power receiving device 3 do not break down or a value obtained by subtracting a predetermined offset value from the upper limit.

While the switching frequency and the voltage of the AC power applied to the transmission coil 14 are controlled, the determination circuit 29 determines whether the measured value of the output voltage falls within a permissive range of the voltage during the constant voltage output operation. The determination circuit 29 notifies the communicator 32 of the determination result. The upper limit of the permissive range of the voltage is preferably set to be less than or equal to the upper-limit threshold.

For this purpose, for example, the determination circuit 29 includes a memory circuit that stores the permissive range of the voltage, an arithmetic circuit that compares the measured value of the output voltage to each of the upper-limit threshold and the permissive range of the voltage, and a control circuit that controls the turn-on and the turn-off of the switching element 28 and the switch circuit 31. The determination circuit 29 may include the same circuit as the circuit used to control the turn-on and the turn-off of a control coil described in Japanese Unexamined Patent Application Publication No. 2015-65724 as the circuit, which compares the measured value of the output voltage to the upper-limit threshold and switches between the turn-on and the turn-off of the switch circuit 31 according to the comparison result. In this case, the voltage at which the switch circuit 31 is turned off may be set lower than the voltage at which the switch circuit 31 is turned on.

The determination circuit 29 switches between the turn-on and the turn-off of the switching element 28 at a predetermined cycle while the measured value of the output voltage deviates from the permissive range of the voltage. Consequently, a resistance value of a whole circuit including the load circuit 26 changes at the predetermined cycle, the whole circuit being connected to the rectification smoothing circuit 23. Thus, the determination circuit 29 determines whether the measured value of the output voltage is kept substantially constant while switching between the turn-on and the turn-off of the switching element 28, which allows the determination circuit 29 to determine whether the non-contact feeding device 1 performs the constant voltage output operation. Therefore, while the measured value of the output voltage is kept substantially constant even when the switching element 28 switches between the turn-on and the turn-off at a predetermined cycle, the determination circuit 29 notifies the communicator 32 that the non-contact feeding device 1 performs the constant voltage output operation.

In the case that the non-contact feeding device 1 performs the constant voltage output operation for a fixed period in which the measured value of the output voltage is longer than that of the predetermined cycle, the determination circuit 29 stops the switching of the switching element 28 to keep the switching element 28 in the turn-on state. The determination circuit 29 determines whether the measured value of the output voltage is included in the permissive range of the voltage, and notifies the communicator 32 of the determination result.

At that point, in the case that the measured value of the output voltage is included in the permissive range of the voltage for the fixed period longer than the predetermined cycle, the determination circuit 29 notifies the communicator 32 of the determination result indicating that the non-contact feeding device 1 performs the constant voltage output operation, and indicating that the measured value of the output voltage falls within the permissive range of the voltage.

According to a modification, the determination circuit 29 may include a resistor connected in parallel to the load circuit 26 with respect to the rectification smoothing circuit 23. In this case, the switching element 28 may be provided so as to be connected in series to the resistor and in parallel to the load circuit 26. In this case, the determination circuit 29 turns off the switching element 28 while the measured value of the output voltage is included in the permissive range of the voltage. On the other hand, when the measured value of the output voltage deviates from the permissive range of the voltage, the determination circuit 29 may switch between the turn-on and the turn-off of the switching element 28 at the predetermined cycle similarly to one or more of the above embodiments. In the modification, the power supply to the load circuit 26 is continued even when the non-contact feeding device 1 does not perform the constant voltage output operation.

According to still another modification, a second switching element such as a MOSFET may be provided in parallel to the above resistor and in series to the load circuit 26. In this case, while the measured value of the output voltage is included in the permissive range of the voltage, the determination circuit 29 turns on the second switching element to enable the power supply to the load circuit 26. On the other hand, when the measured value of the output voltage deviates from the permissive range of the voltage, the determination circuit 29 may turn off the second switching element to stop the power supply to the load circuit 26. Consequently, even when the voltage of the received power becomes excessively high while the switching frequency is adjusted by the power transmission device 2, the excessively high voltage is prevented from being applied to the load circuit 26.

The resonance suppressing coil 30 is provided so as to be capable of electromagnetically coupling to the receiving coil 21 of the resonance circuit 20. For example, the resonance suppressing coil 30 and the receiving coil 21 are wound around the same core wire. Both ends of the resonance suppressing coil 30 are connected to the switch circuit 31. When the resonance suppressing coil 30 is short-circuited by the switch circuit 31, the resonance suppressing coil 30 is electromagnetically coupled to the receiving coil 21, and the resonance frequency of the resonance circuit 20 changes. Therefore, even when the voltage output from the resonance circuit 20 increases excessively, the resonance suppressing coil 30 is short-circuited to decrease the power transmitted from the power transmission device 2 to the power receiving device 3, thereby decreasing the voltage output from the resonance circuit 20. A number of turns of the receiving coil 21 and a number of turns of the resonance suppressing coil 30 may be equal to or different from each other.

On the other hand, when the switch circuit 31 opens both the ends of the resonance suppressing coil 30, the resonance suppressing coil 30 does not get involved in the resonance between the transmission coil 14 and the receiving coil 21, and does not influence the power transmission from the power transmission device 2 to the power receiving device 3.

The switch circuit 31 is connected to both the ends of the resonance suppressing coil 30, and switches between the short circuit and the open of the resonance suppressing coil 30 according to the control signal from the determination circuit 29. That is, the switch circuit 31 short-circuits the resonance suppressing coil 30 while receiving the control signal turning on the resonance suppressing coil 30 from the determination circuit 29. On the other hand, the switch circuit 31 opens both the ends of the resonance suppressing coil 30 while receiving the control signal turning off the resonance suppressing coil 30 from the determination circuit 29.

Figure 2A:
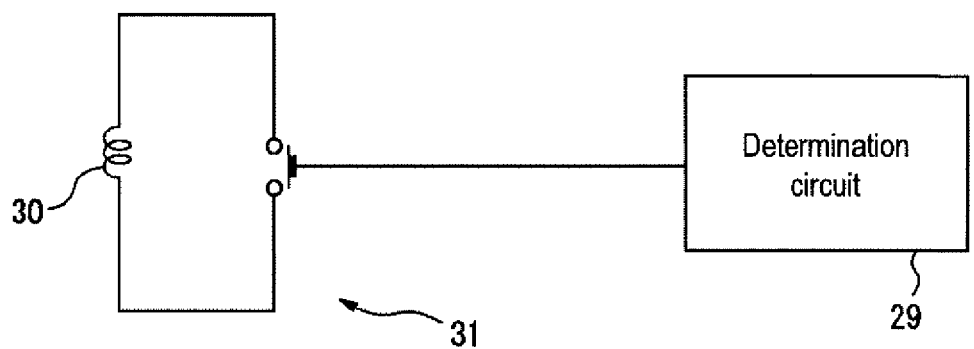
FIGS. 2A to 2D are views each illustrating an example of a switch circuit.

FIGS. 2A to 2D are views each illustrating an example of the switch circuit 31. In the example of FIG. 2A, the switch circuit 31 includes a relay. When the determination circuit 29 turns on the relay, the resonance suppressing coil 30 is short-circuited. On the other hand, when the determination circuit 29 turns off the relay, both ends of the resonance suppressing coil 30 are open.

Figure 2B:
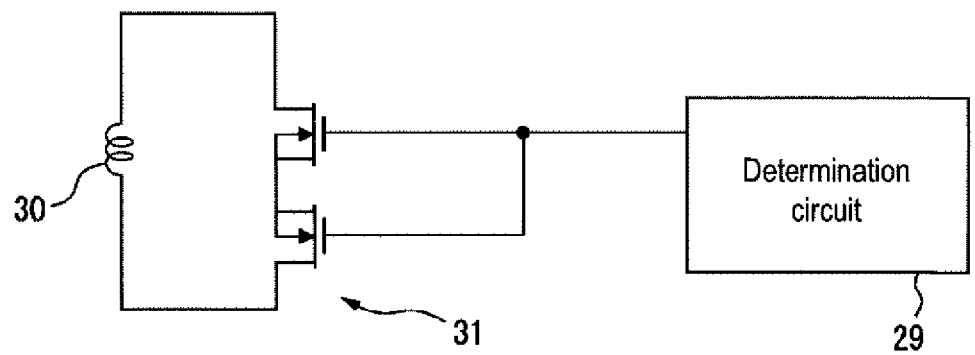

In the example of FIG. 2B, the switch circuit 31 includes two n-channel MOSFETs connected in series between both ends of the resonance suppressing coil 30. The source terminals of the two MOSFETs are connected to each other, and the drain terminals of the two MOSFETs are connected to both the ends of the resonance suppressing coil 30. The gate terminals of the two MOSFETs are connected to the determination circuit 29. When a relatively high voltage corresponding to the control signal turning on the MOSFET is applied from the determination circuit 29 to the gate terminals of the two MOSFETs, the resonance suppressing coil 30 is short-circuited because the current can be passed between the source and the drain of each MOSFET. On the other hand, when a relatively low voltage corresponding to the control signal turning off the MOSFET is applied from the determination circuit 29 to the gate terminals of the two MOSFETs, the current is not passed between the source and the drain of each MOSFET, and body diodes of the two MOSFETs are also reverse to each other, so that the current is not passed through each body diode. For this reason, both the ends of the resonance suppressing coil 30 are open.

Figure 2C:
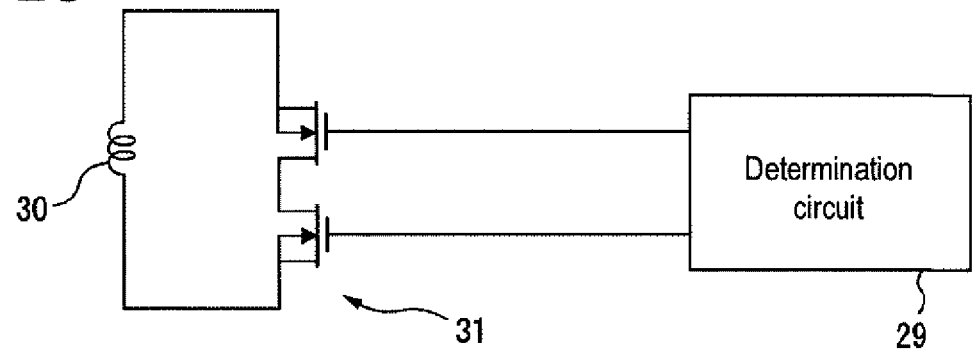

In the example of FIG. 2C, similarly to the example in FIG. 2B, the switch circuit 31 includes two n-channel MOSFETs connected in series between both the ends of the resonance suppressing coil 30. However, in the example of FIG. 2C, the drain terminals of the two MOSFETs are connected to each other, and the source terminals of the two MOSFETs are connected to both the ends of the resonance suppressing coil 30. In the example of FIG. 2C, the resonance suppressing coil 30 is also short-circuited when a relatively high voltage corresponding to the control signal turning on the MOSFET is applied to the gate terminals of the two MOSFETs from the determination circuit 29. On the other hand, both ends of the resonance suppressing coil 30 are open when a relatively low voltage corresponding to the control signal turning off the MOSFET is applied to the gate terminals of the two MOSFETs from the determination circuit 29.

Figure 2D:
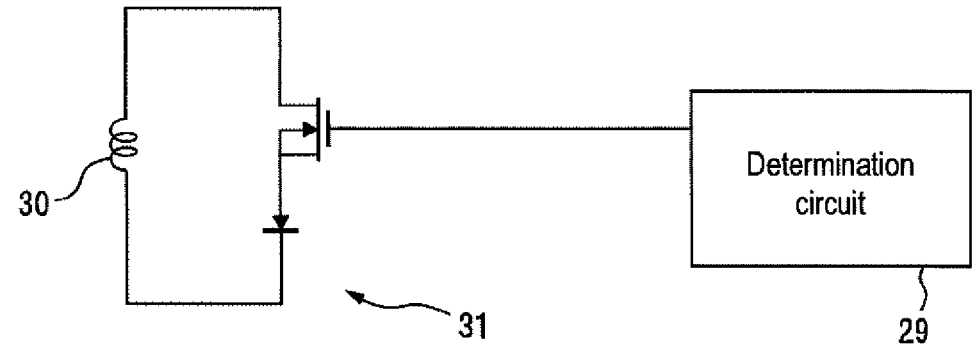

In the example of FIG. 2D, the switch circuit 31 has an n-channel MOSFET and a diode, which are connected in series between both ends of the resonance suppressing coil 30. The drain terminal of the MOSFET is connected to one end of the resonance suppressing coil 30, and the source terminal of the MOSFET is connected to an anode terminal of the diode. The gate terminal of the MOSFET is connected to the determination circuit 29. A cathode terminal of the diode is connected to the other end of the resonance suppressing coil 30. In the example of FIG. 2D, the resonance suppressing coil 30 is also short-circuited when a voltage corresponding to the control signal turning on the MOSFET is applied to the gate terminal of the MOSFET from the determination circuit 29. On the other hand, both the ends of the resonance suppressing coil 30 are open when a voltage corresponding to the control signal turning off the MOSFET is applied to the gate terminal of the MOSFET from the determination circuit 29. In the example of FIG. 2D, because the current passed from the diode to the MOSFET side is cut off even when the MOSFET is turned on, the resonance suppressing coil 30 does not influence the resonance of the resonance circuit 20 in a period of a half cycle of the alternating current passed through the resonance suppressing coil 30. However, even in this case, the voltage output from the resonance circuit 20 decreases because the power transmitted from the power transmission device 2 to the power receiving device 3 decreases.

When being notified that the measured value of the output voltage becomes greater than or equal to the upper-limit threshold from the determination circuit 29, the communicator 32 generates a radio signal (output voltage abnormal signal) indicating the content of the notification and including the abnormal voltage generation information, and transmits the radio signal to the communicator 15 of the power transmission device 2. Until the constant voltage output operation is resumed since the measured value of the output voltage becomes greater than or equal to the upper-limit threshold, in each predetermined transmission cycle, the communicator 32 generates a radio signal including the determination information indicating whether the non-contact feeding device 1 performs the constant voltage output operation and whether the measured value of the output voltage is included in the permissive range of the voltage according to the determination result received from the determination circuit 29, and transmits the radio signal to the communicator 15 of the power transmission device 2. For this purpose, for example, the communicator 32 includes a communication circuit that generates the radio signal pursuant to a predetermined radio communication standard and an antenna that outputs the radio signal. Similarly to the communicator 15, examples of the predetermined radio communication standard include ISO/IEC 15693, ZigBee (registered trademark), and Bluetooth (registered trademark).

Details of the operation of the non-contact feeding device 1 will be described below.

In one or more embodiments, upon receiving the abnormal voltage generation information from the communicator 15, the control circuit 17 of the power transmission device 2 starts adjustment of the switching frequency and the voltage of the AC power supplied to the transmission coil 14 such that the non-contact feeding device 1 can perform the constant voltage output operation. Based on the determination information received from the communicator 15, the control circuit 17 controls the switching frequency and the voltage of the AC power supplied from the power supply circuit 10 to the transmission coil 14 until the non-contact feeding device 1 resumes the constant voltage output operation.

As described above, the non-contact feeding device of one or more embodiments has the same configuration as the SS system, although the non-contact feeding device does not use the resonance on the power transmission side. Consequently, the frequency characteristic of the output voltage of the non-contact feeding device 1 is similar to the frequency characteristic of the output voltage of the SS system non-contact feeding device.

Figure 3:
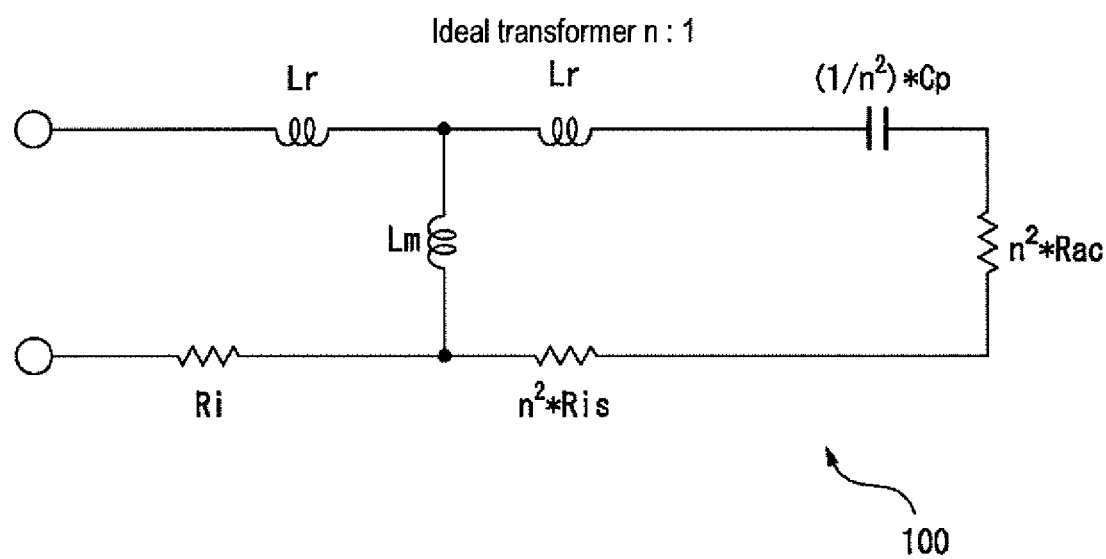
FIG. 3 is an equivalent circuit diagram illustrating the non-contact feeding device when a resonance suppressing coil is open.

FIG. 3 is an equivalent circuit diagram illustrating the non-contact feeding device 1 when the resonance suppressing coil 30 is open. In an equivalent circuit 100, it is assumed that the transmission coil 14 on the power transmission side and the receiving coil 21 of the resonance circuit 20 on the power receiving side are coupled to form an ideal transformer of n:1. The transmission coil 14 on the power transmission side has leakage inductance Lr and excitation inductance Lm. Inductance Lp of the transmission coil 14 on the power transmission side is equal to (Lm+Lr). Assuming that k is the degree of coupling between the transmission coil 14 and the receiving coil 21, Lr=(1−k) Lp and Lm=kLp are obtained. The power transmission side has a winding resistance value Ri, and the power receiving side has a winding resistance value Ris. In the resonance circuit 20 on the power receiving side, the resonance capacitor 22 connected in series to the receiving coil 21 has capacitance Cp. The load circuit 26 has an AC equivalent resistance value Rac, and the AC equivalent resistance value Rac is represented by Rac=(8/$\pi^2$)×Ro using a resistance value Ro of the load circuit 26.

Figure 4:
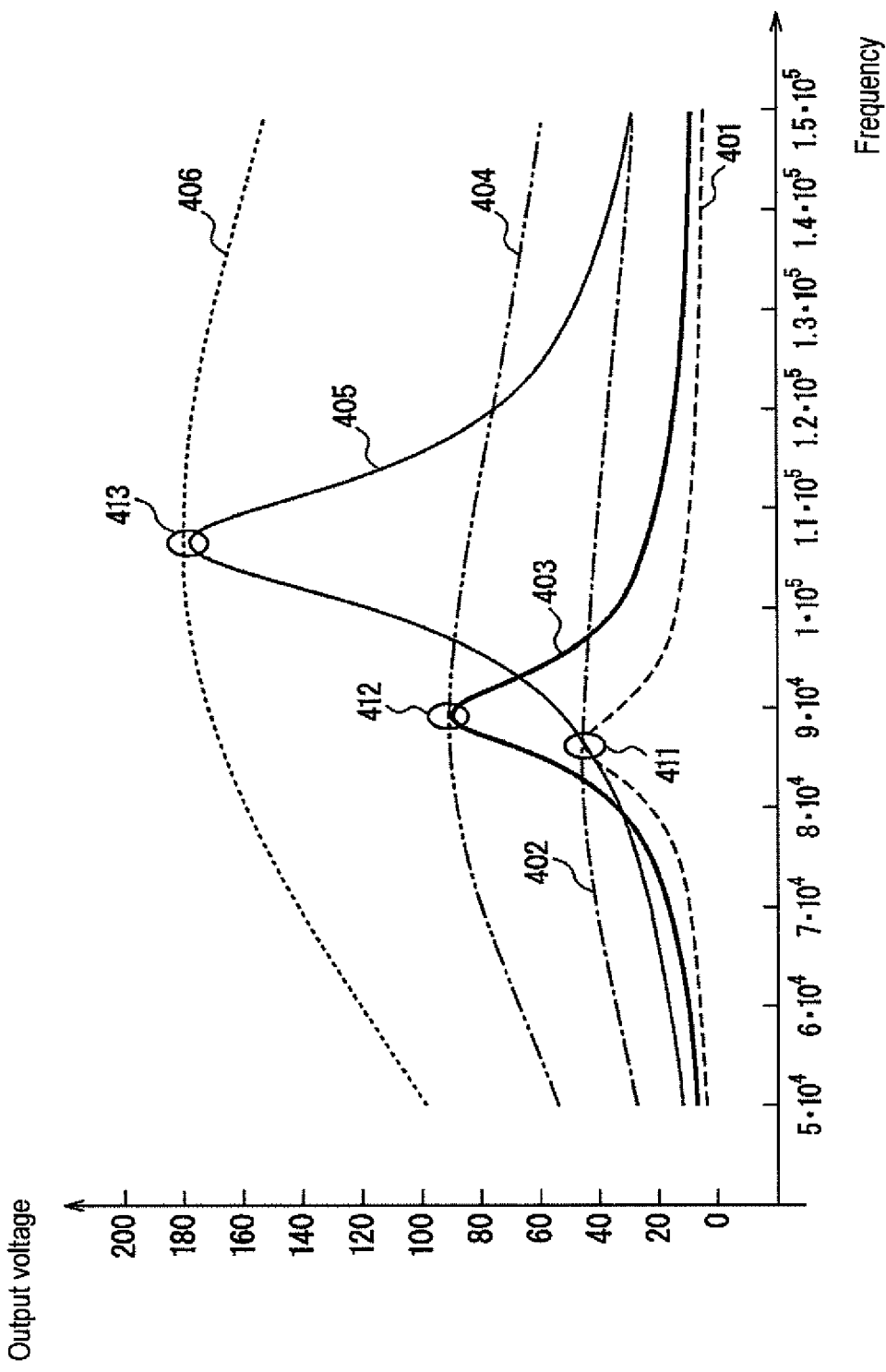
FIG. 4 is a view illustrating an example of a simulation result for a frequency characteristic of an output voltage in the non-contact feeding device of one or more embodiments of the present invention.

FIG. 4 is a view illustrating an example of a simulation result of a frequency characteristic of the output voltage in the non-contact feeding device 1 of one or more embodiments of the present invention. In FIG. 4, the horizontal axis represents the frequency and the vertical axis represents the output voltage. This simulation was made under the conditions of Lp=174 μH, Cp=20 nF, Ri=Ris=0.1Ω, n=1, Vin=300 V, and Ro=10 Ω (Rac=8.1Ω). A curve 401 represents the frequency characteristic of the output voltage when the degree of coupling k is set to 0.15 and when the AC equivalent resistance value of the load circuit 26 is set to Rac. A curve 402 represents the frequency characteristic of the output voltage when the degree of coupling k is set to 0.15 and when the AC equivalent resistance value of the load circuit 26 is set to (10*Rac). A curve 403 represents the frequency characteristic of the output voltage when the degree of coupling k is set to 0.3 and when the AC equivalent resistance value of the load circuit 26 is set to Rac. A curve 404 represents the frequency characteristic of the output voltage when the degree of coupling k is set to 0.3 and when the AC equivalent resistance value of the load circuit 26 is set to (10*Rac). A curve 405 represents the frequency characteristic of the output voltage when the degree of coupling k is set to 0.6 and when the AC equivalent resistance value of the load circuit 26 is set to Rac. A curve 406 represents the frequency characteristic of the output voltage when the degree of coupling k is set to 0.6 and when the AC equivalent resistance value of the load circuit 26 is set to (10*Rac).

As illustrated in FIG. 4, the combination of the frequency and the output voltage, in which the output voltage is kept substantially constant (that is, the constant voltage output is obtained) even when the AC equivalent resistance value of the load circuit 26 changes under the condition that the degree of coupling k does not change, exists in each degree of coupling (three combinations, that is, the points 411 to 413 in FIG. 4). Thus, even when the AC power having the switching frequency at which the transmission coil 14 does not resonate is applied to the transmission coil 14, the non-contact feeding device 1 can be caused to perform the constant voltage output operation with respect to the change in the resistance value of the load circuit 26. As indicated by the points 411 to 413, although the output voltages at the time the constant voltage is output in relation to the fluctuation in resistance value of the load circuit 26 varies according to the degree of coupling, the difference in output voltage can be set to the substantially constant output voltage irrespective of the degree of coupling by adjusting the voltage applied to the transmission coil 14.

Figure 5:
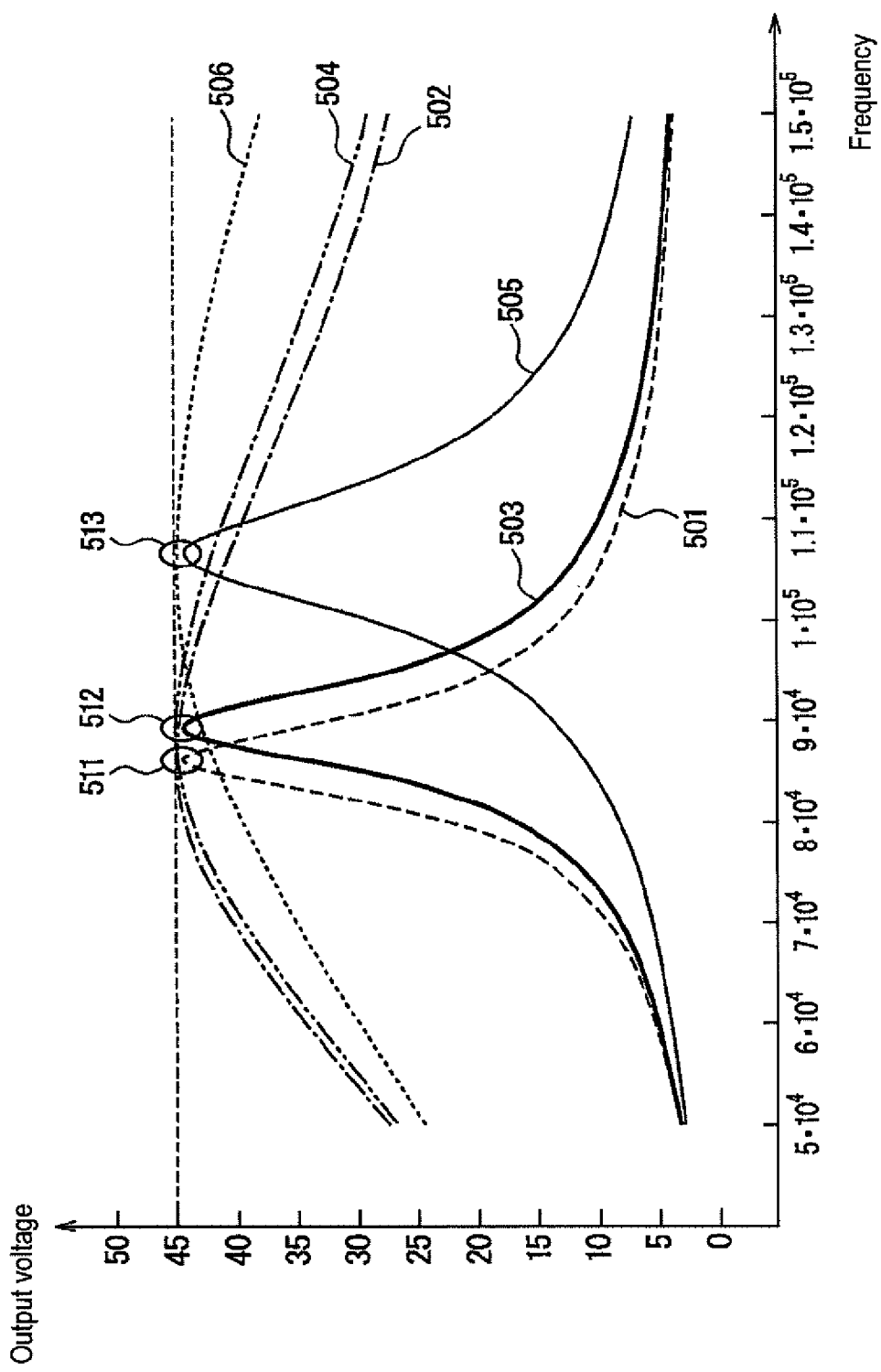
FIG. 5 is a view illustrating an example of the simulation result for the frequency characteristic of the output voltage when voltage applied to a transmission coil is changed according to a degree of coupling in the simulation of FIG. 4.

FIG. 5 is a view illustrating an example of the simulation result of the frequency characteristic of the output voltage when the voltage applied to the transmission coil 14 is changed according to the degree of coupling in the simulation of FIG. 4. In FIG. 5, the horizontal axis represents the frequency and the vertical axis represents the output voltage. A curve 501 represents the frequency characteristic of the output voltage when the degree of coupling k is set to 0.15, when the AC equivalent resistance value of the load circuit 26 is set to Rac, and when the voltage applied to the transmission coil is set to Vin. A curve 502 represents the frequency characteristic of the output voltage when the degree of coupling k is set to 0.15, when the AC equivalent resistance value of the load circuit 26 is set to (10*Rac), and when the voltage applied to the transmission coil is set to Vin. A curve 503 represents the frequency characteristic of the output voltage when the degree of coupling k is set to 0.3, when the AC equivalent resistance value of the load circuit 26 is set to Rac, and when the voltage applied to the transmission coil is set to (0.5*Vin). A curve 504 represents the frequency characteristic of the output voltage when the degree of coupling k is set to 0.3, when the AC equivalent resistance value of the load circuit 26 is set to (10*Rac), and when the voltage applied to the transmission coil is set to (0.5*Vin). A curve 505 represents the frequency characteristic of the output voltage when the degree of coupling k is set to 0.6, when the AC equivalent resistance value of the load circuit 26 is set to Rac, and when the voltage applied to the transmission coil is set to (0.25*Vin). A curve 506 represents the frequency characteristic of the output voltage when the degree of coupling k is set to 0.6, when the AC equivalent resistance value of the load circuit 26 is set to (10*Rac), and when the voltage applied to the transmission coil is set to (0.25*Vin).

There are three combinations of the frequency and the output voltage, that is, the points 511 to 513, in which the output voltage is kept substantially constant (that is, the constant voltage output is obtained) even when the AC equivalent resistance value of the load circuit 26 changes under the condition that the degree of coupling k does not change, the combination of the frequency and the output voltage corresponding to the points 411 to 413 in FIG. 4. The output voltages of the points 511 to 513 are substantially equal to one another.

As described above, even when either the resistance value or the degree of coupling of the load circuit 26 fluctuates, the output voltage is kept substantially constant by properly adjusting the switching frequency and the voltage of the AC power applied to the transmission coil 14.

In order to achieve the constant voltage output operation, the control circuit 17 controls the switching frequency and the voltage of the AC power applied to the transmission coil 14 as described below.

Upon receiving abnormal voltage generation information from the communicator 15, the control circuit 17 decreases the voltage of the AC power applied to the transmission coil 14 to the lower limit voltage. Consequently, on the side of the power receiving device 3, even when the resonance suppressing coil 30 is open, the voltage output from the resonance circuit 20 decreases and becomes less than or equal to the upper-limit threshold. In the case that the determination information included in the radio signal received from the power receiving device 3 through the communicator 15 indicates that the non-contact feeding device 1 does not perform the constant voltage output operation, the control circuit 17 changes the switching frequency of the AC power within a predetermined frequency domain. For example, the predetermined frequency domain can be set to a frequency domain where a frequency at which the constant voltage output is obtained in the minimum value of the prospected degree of coupling between the transmission coil 14 and the receiving coil 21 is set to the lower limit while a frequency at which the constant voltage output is obtained in the maximum value of the prospected degree of coupling between the transmission coil 14 and the receiving coil 21 is set to the upper limit in the case that the power is fed from the power transmission device 2 to the power receiving device 3.

When changing the switching frequency, the control circuit 17 may sequentially increase the switching frequency from the lower limit to the upper limit of the predetermined frequency domain, or sequentially decrease the switching frequency from the upper limit to the lower limit of the predetermined frequency domain. At this time, the control circuit 17 preferably changes the switching frequency stepwise such that the determination circuit 29 of the power receiving device 3 can check whether the output voltage is kept substantially constant and such that the same switching frequency is kept longer than the cycle during which the determination circuit 29 switches the switching element 28.

When the determination information included in the radio signal received from the power receiving device 3 through the communicator 15 indicates that the measured value of the output voltage is kept substantially constant even when the resistance of the load circuit 26 changes although the measured value of the output voltage is not included in the permissive range of the voltage, namely, that the constant voltage output operation is performed, the control circuit 17 keeps the switching frequency constant accordingly. The control circuit 17 decides the duty ratio by referring to the reference table representing the relationship between the switching frequency and the duty ratio of the turn-on and turn-off control of the switching element SW of the power factor improvement circuit 12, the constant voltage output being obtained at the switching frequency irrespective of the degree of coupling at the duty ratio. The control circuit 17 controls the gate driver 16-1 so as to switch the switching element SW of the power factor improvement circuit 12 according to the duty ratio. Consequently, the voltage applied to the transmission coil 14 is adjusted such that the output voltage from the resonance circuit 20 is included in the permissive range of the voltage, namely, such that the constant voltage is output irrespective of the degree of coupling. When the determination information included in the radio signal received from the power receiving device 3 through the communicator 15 indicates that the measured value of the output voltage is included in the permissive range of the voltage, the control circuit 17 keeps the switching frequency and the voltage of the AC power supplied to the transmission coil 14 constant.

Instead of referring to the reference table to decide the duty ratio, the control circuit 17 may gradually change the duty ratio until the determination information included in the radio signal received from the power receiving device 3 through the communicator 15 indicates that the measured value of the output voltage is included in the permissive range of the voltage.

In order to improve energy transmission efficiency, preferably the power supply circuit 10 and the transmission coil 14 of the power transmission device 2 continuously perform soft switching (inductive) operation. In order that the power supply circuit 10 and the transmission coil 14 perform the soft switching operation, preferably the phase of the current passed through the transmission coil 14 is delayed from the phase of the applied voltage. Consequently, for example, when the switching elements 13-1 and 13-4 are turned on, the current is passed from the source terminal to the drain terminal of the switching element 13-1, so that the power supply circuit 10 and the transmission coil 14 performs the soft switching operation to suppress generation of a switching loss.

As described above, when the voltage output from the resonance circuit of the power receiving device becomes greater than or equal to the upper-limit threshold, the non-contact feeding device changes the resonance frequency of the resonance circuit to decrease the transmitted power by short-circuiting the resonance suppressing coil that can be electromagnetically coupled to the receiving coil of the resonance circuit, notifies the power transmission device that the output voltage becomes greater than or equal to the upper-limit threshold, and changes the switching frequency and the voltage of the AC power applied to the transmission coil by the power transmission device such that the constant voltage output operation is performed. For this reason, in the non-contact feeding device, the power transmission can continuously be performed while the power receiving device or the load circuit is prevented from breaking down due to the excessive increase in voltage output from the resonance circuit, and the energy loss can be suppressed.

According to a modification, in the power transmission device 2, the power supply circuit that supplies the AC power to the transmission coil 14 may have any circuit configuration different from one or more of the above embodiments as long as the circuit can variably adjust the switching frequency and the voltage applied to the transmission coil 14.

Figure 6:
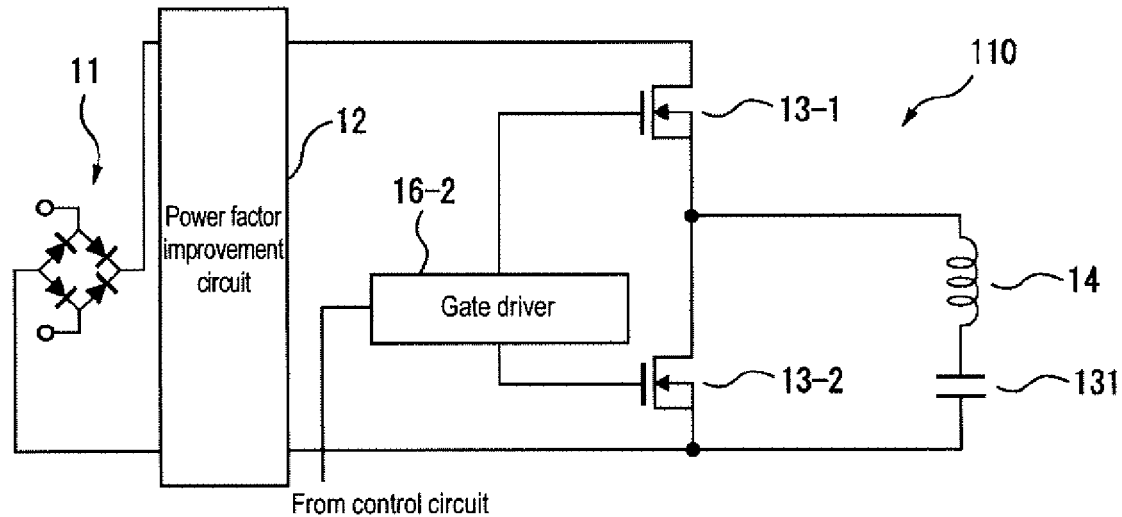
FIG. 6 is a circuit diagram illustrating a power supply circuit according to a modification.

FIG. 6 is a circuit diagram illustrating a power supply circuit according to a modification.

A power supply circuit 110 in FIG. 6 includes the power source 11, the power factor improvement circuit 12, the two switching elements 13-1 and 13-2, and a capacitor 131 for DC cutoff which is connected in series to the transmission coil 14. In the modification of FIG. 6, for example, each switching element can be constructed with an n-channel type MOSFET. For example, the power factor improvement circuit 12 can be identical to the power factor improvement circuit 12 of one or more embodiments.

In the modification, the switching elements 13-1 and 13-2 are connected in series between the positive-side terminal and the negative-side terminal of the power source 11. The switching element 13-1 is connected to the positive side of the power source 11, and the switching element 13-2 is connected to the negative side of the power source 11. The drain terminal of the switching element 13-1 is connected to the positive-side terminal of the power source 11 through the power factor improvement circuit 12, and the source terminal of the switching element 13-1 is connected to the drain terminal of the switching element 13-2. The source terminal of the switching element 13-2 is connected to the negative-side terminal of the power source 11 through the power factor improvement circuit 12. The source terminal of the switching element 13-1 and the drain terminal of the switching element 13-2 are connected to one end of the transmission coil 14, and the source terminal of the switching element 13-2 is connected to the other end of the transmission coil 14 through the capacitor 131. The gate terminal of each switching element is connected to the gate driver 16-2.

In this modification, the gate driver 16-2 may alternately switch between the turn-on and the turn-off of the switching elements 13-1 and 13-2 according to the control signal from the control circuit. That is, in the case that the switching element 13-1 is turned on while the switching element 13-2 is turned off, the current is passed from the power source 11 to the transmission coil 14 through the power factor improvement circuit 12 and the switching element 13-1, and the capacitor 131 is charged. On the other hand, in the case that the switching element 13-1 is turned off while the switching element 13-2 is turned on, the capacitor 131 is discharged and the current is passed from the capacitor 131 through the transmission coil 14 and the switching element 13-2. Thus, in this modification, the control circuit may control the switching frequency at which the switching elements 13-1 and 13-2 are switched through the gate driver 16-2 according to the determination information received from the power receiving device 3.

In one or more embodiments, a capacitor for DC cutoff which is connected in series to the transmission coil 14 may be provided similarly to the power supply circuit 110. However, in this case, in order that the transmission coil 14 and the capacitor are not operated as the resonance circuit in the frequency region where the switching frequency is adjusted, capacitance of the capacitor is preferably set such that the resonance frequency of the transmission coil 14 and the capacitor is lower than a lower-limit frequency of the frequency region where the resonance frequency and the switching frequency of the resonance circuit 20 of the power receiving device 3 are adjusted. Consequently, the resonance on the transmission side is not used in the power transmission, so that the decrease in power transmission efficiency is suppressed even when the degree of coupling between the transmission coil 14 and the receiving coil 21 is low. Even when the resonance suppressing coil 30 is short-circuited to suppress the resonance of the resonance circuit 20, the resonance on the transmission side is not used, so that the input impedance becomes large to some extent to decrease the current passed through the transmission coil 14. As a result, the energy loss is suppressed.

According to still another modification, the determination circuit 29 may include a timer circuit. In this case, the determination circuit 29 may count an elapsed time since the resonance suppressing coil 30 is short-circuited using a timer circuit, control the switch circuit 31 such that the control circuit 17 of the power transmission device 2 opens both the ends of the resonance suppressing coil 30 at a point of time a predetermined period necessary for the decrease in voltage of the AC power applied to the transmission coil 14 elapses, and start the turn-on and turn-off control of the switching element 28. Alternatively, the communicator 15 of the power transmission device 2 and the communicator 32 of the power receiving device 3 may be configured to be capable of conducting bidirectional communication. In this case, when the control circuit 17 of the power transmission device 2 decreases the voltage of the AC power applied to the transmission coil 14, the control circuit 17 may notify the communicator 32 of the power receiving device 3 through the communicator 15 that the voltage of the AC power applied to the transmission coil 14 is decreased. When it is notified that the voltage of the AC power applied to the transmission coil 14 is decreased through the communicator 32, the determination circuit 29 of the power receiving device 3 may start the turn-on and turn-off control of the switching element 28 while controlling the switch circuit 31 so as to open both the ends of the resonance suppressing coil 30.

Even in this modification, in the non-contact feeding device, the power transmission can continuously be performed while the power receiving device or the load circuit is prevented from breaking down due to the excessive increase in voltage output from the resonance circuit, and the energy loss can be suppressed.

According to still another modification, the switching element 28 connected between the load circuit 26 and the rectification smoothing circuit 23 may be omitted. In this case, upon receiving the abnormal voltage generation information through the communicator 15, the control circuit 17 of the power transmission device 2 may decrease the voltage of the AC power applied to the transmission coil 14 until the voltage output from the resonance circuit 20 becomes less than the upper-limit threshold. In this case, the power supply circuit of the power transmission device 2 can be any one of various circuits capable of adjusting the voltage of the AC power applied to the transmission coil 14.

In one or more embodiments and each modification, in the case that the communicator of the power transmission device and the communicator of the power receiving device can be connected to each other in a wired manner, each of the communicators may include a communication circuit that can transmit and receive a signal including the determination information in the wired manner.

Thus, those skilled in the art can make various modifications to the above embodiments within a scope of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A non-contact feeding device comprising: a power transmission device; and
    a power receiving device to which power is transmitted from the power transmission device in
    a non-contact manner, wherein the power transmission device includes:
    a transmission coil configured to supply the power to the power receiving device, a power supply circuit configured to supply AC power to the transmission coil and to be capable of adjusting at least one of a switching frequency and voltage of the AC power supplied to the transmission coil, a first communicator configured to receive an output voltage abnormal signal from the power receiving device, and
    a control circuit configured to change at least one of the switching frequency and the voltage of the AC power supplied from the power supply circuit to the transmission coil when the first communicator receives the output voltage abnormal signal,
    wherein the power receiving device includes:
    a resonance circuit including a receiving coil receiving the power from the power transmission device and a resonance capacitor connected in series to the receiving coil,
    a rectifier circuit configured to rectify the power received through the resonance circuit,
    a resonance suppressing coil disposed so as to be capable of being electromagnetically coupled to the receiving coil,
    a switch circuit connected to the resonance suppressing coil to be capable of switching between short circuit and opening of the resonance suppressing coil, a voltage detection circuit configured to measure an output voltage of a power output from the rectifier circuit to obtain a measured value of the output voltage; a switching element connected between the rectifier circuit and a load circuit;

a second communicator capable of communicating with the first communicator, and a determination circuit configured to cause the second communicator to transmit the output voltage abnormal signal while controlling the switch circuit so as to short-circuit the resonance suppressing coil when the measured value of the output voltage becomes greater than or equal to a predetermined upper-limit threshold, wherein the determination circuit switches the switching element between ON and OFF when the measured value of the output voltage deviates from a permissive range.

2. The non-contact feeding device according to claim 1, wherein the determination circuit of the power receiving device controls the switch circuit so as to open the resonance suppressing coil when the control circuit of the power transmission device starts the change of at least one of the switching frequency and the voltage of the AC power.

3. The non-contact feeding device according to claim 1, wherein, when the first communicator receives the output voltage abnormal signal, the control circuit of the power transmission device controls the switching frequency of the AC power supplied from the power supply circuit to the transmission coil such that the measured value of the output voltage does not change even when a resistance of the load circuit connected to the rectifier circuit of the power receiving device changes.

4. The non-contact feeding device according to claim 2, wherein, when the first communicator receives the output voltage abnormal signal, the control circuit of the power transmission device controls the switching frequency of the AC power supplied from the power supply circuit to the transmission coil such that the measured value of the output voltage does not change even when a resistance of the load circuit connected to the rectifier circuit of the power receiving device changes.

* * * * *